(12) United States Patent
Shenoy et al.

(10) Patent No.: US 12,459,752 B2
(45) Date of Patent: Nov. 4, 2025

(54) CONVEYOR SYSTEM CONTROL VIA PREDICTIVE FEED-FORWARD MAPPING

(71) Applicant: INTELLIGRATED HEADQUARTERS, LLC, Mason, OH (US)

(72) Inventors: Gowrish G. Shenoy, Charlotte, NC (US); Kalirajan Chelliah, Charlotte, NC (US); Sakthivel Raj, Charlotte, NC (US); Karthikeyan Murugesan, Charlotte, NC (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 535 days.

(21) Appl. No.: 18/058,469

(22) Filed: Nov. 23, 2022

(65) Prior Publication Data

US 2023/0174316 A1    Jun. 8, 2023

(30) Foreign Application Priority Data

Dec. 8, 2021   (IN) .............................. 202111056968

(51) Int. Cl.
*B65G 43/10* (2006.01)
*B65G 39/12* (2006.01)

(52) U.S. Cl.
CPC .............. *B65G 43/10* (2013.01); *B65G 39/12* (2013.01)

(58) Field of Classification Search
CPC .................... B65G 43/10; B65G 39/12; B65G 2203/0208; B65G 2203/044; B65G 13/02; B65G 43/08
See application file for complete search history.

(56) References Cited

U.S. PATENT DOCUMENTS

| | | | |
|---|---|---|---|
| 4,853,602 A * | 8/1989 | Hommes | B60L 15/005 318/135 |
| 4,921,092 A | 5/1990 | Crawford et al. | |
| 8,550,234 B2 | 10/2013 | Breen et al. | |
| 9,365,347 B2 | 6/2016 | Nakamura | |
| 10,757,394 B1 * | 8/2020 | Wang | G06T 7/20 |
| 2002/0060795 A1 * | 5/2002 | Metcalfe | G01B 11/04 356/625 |
| 2019/0389670 A1 * | 12/2019 | Anderson | B65G 43/08 |
| 2022/0267100 A1 * | 8/2022 | Ramesh | B65G 43/08 |
| 2024/0010434 A1 * | 1/2024 | Shenoy | G05B 19/4189 |
| 2024/0242063 A1 * | 7/2024 | Imoto | G05B 13/04 |

* cited by examiner

*Primary Examiner* — Michael Collins
(74) *Attorney, Agent, or Firm* — ALSTON & BIRD LLP

(57) ABSTRACT

Various embodiments are directed to predicting and mapping a location of an object transported by a conveyor system with respect to a sequence of zones of the conveyor system. An example method includes detecting the presence of the object in a first zone using a first photo-eye. The first zone is controlled with a first roller rotational speed. The method further includes generating a virtual map to describe a location of the object. The location of the object is dynamically determined at least by predicting the object's presence in a given zone using a roller rotational speed of one or more preceding zones and configuring a roller rotational speed of the given zone in accordance with the object predicted to be present in the given zone. The method further includes evaluating the virtual map's accuracy with detecting the object in a final zone using a second photo-eye.

20 Claims, 4 Drawing Sheets

CONVEYOR SYSTEM CONTROL VIA PREDICTIVE FEED-FORWARD MAPPING

CROSS-REFERENCE TO RELATED APPLICATIONS

This application claims priority pursuant to 35 U.S.C. 119(a) to Indian Application No. 202111056968, filed Dec. 8, 2021, which application is incorporated herein by reference in its entirety.

FIELD OF THE INVENTION

Various embodiments described herein relate generally to control and operation of conveyor systems, including motor driven roller (MDR) conveyor systems. In particular, various example embodiments are related to individual control and operation of different zones within a conveyor system to transport an object from an infeed point to a discharge point.

BACKGROUND

Conveyor systems and assemblies may be used in industrial manufacturing and packing applications, for example, to facilitate the transportation of a large number of objects to a desired destination within a factory or a warehouse. Real-time tracking or positioning of objects being transported within a conveyor system allows for finer control of conveyor system operation, as well as for analyzing conveyor system performance, for enabling auxiliary processing tasks to be performed on transported objects before the desired destination, and/or the like. Through applied effort, ingenuity, and innovation, the problems identified herein have been solved by developing solutions that are included in embodiments of the present disclosure, many examples of which are described in detail herein.

BRIEF SUMMARY

Various embodiments described herein relate to methods, apparatuses, computer program products, and/or the like for predicting and mapping a real-time location of an object being transported by a conveyor system through a sequence of zones. In various example embodiments, the conveyor system is a motor driven roller (MDR) conveyor system. According to an aspect of the present disclosure, a method for operating a conveyor system to transport an object disposed thereon is provided. In various embodiments, the conveyor system includes a plurality of motor driven rollers (MDRs) and has a sequence of zones defined. In an example embodiment, the method includes detecting a presence of the2bjectt in a first zone of the conveyor system using a first photo-eye, the first zone having a first MDR rotational speed. The method further includes generating a virtual map to describe a real-time location of the object within the conveyor system. The real-time location of the object is dynamically determined based at least in part on predicting the presence of the object in a given zone at a given timepoint based at least in part on a previously detected and/or predicted presence of the object in one or more preceding zones and a MDR rotational speed of each preceding zone. The method further includes, in accordance with the predicted presence of the object in the given zone at the given timepoint, configuring a MDR rotational speed of the given zone for at least the given timepoint. The method further includes evaluating an accuracy of the virtual map responsive to detecting the presence of the object in a final zone of the conveyor system using a second photo-eye.

In various embodiments, the method further includes determining a length of the object based at least in part on the first MDR rotational speed and an elapsed time period during which the presence of the object in the first zone is detected by the first photo-eye. The MDR rotational speed of the given zone may be configured based at least in part on the length of the object. The MDR rotational speed of the given zone may be associated with an operational time period including the given timepoint, the operational time period determined based at least in part on the length of the object and representative of a duration of time when the object is present in the given zone.

In various embodiments, evaluating the accuracy of the virtual map includes determining an error measure of the virtual map based at least in part on comparing a predicted final timepoint at which the object was predicted to be present in the final zone with an observed final timepoint at which the presence of the object in the final zone was detected by the second photo-eye. In various embodiments, the method further includes determining whether the error measure satisfies one or more error thresholds, and responsive to a determination that the error measure satisfies the one or more error thresholds, configuring the virtual map for describing a real-time location of one or more subsequent objects within the conveyor system. In various embodiments, the MDR rotational speed of a particular zone is initialized and/or configured to be at least substantially zero for a time period during which no objects are predicted to be present in the particular zone.

According to another aspect of the present disclosure, an apparatus for operating a conveyor system to transport an object disposed thereon is provided, and in various embodiments, the conveyor system includes a plurality of MDRs and has defined a sequence of zones. The apparatus comprises a processor and a memory storing executable instructions. The executable instructions are configured to, with the processor, cause the apparatus to detect a presence of an object in a first zone of the conveyor system using a first photo-eye, the first zone having a first MDR rotational speed. The executable instructions are further configured to, with the processor, cause the apparatus to generate a virtual map to describe a real-time location of the object within the conveyor system that is dynamically determined based at least in part on predicting the presence of the object in a given zone at a given timepoint based at least in part on a previously detected and/or predicted presence of the object in one or more preceding zones and a MDR rotational speed of each preceding zone. The executable instructions are further configured to, with the processor, cause the apparatus to, in accordance with the predicted presence of the object in the given zone at the given timepoint, configure a MDR rotational speed of the given zone for at least the given timepoint. The executable instructions are further configured to, with the processor, cause the apparatus to evaluate an accuracy of the virtual map responsive to detecting the presence of the object in a final zone of the conveyor system using a second photo-eye.

In various embodiments, the executable instructions are further configured to, with the processor, cause the apparatus to determine a length of the object based at least in part on the first MDR rotational speed and an elapsed time period during which the presence of the object in the first zone is detected by the first photo-eye. The MDR rotational speed of the given zone may be configured based at least in part on the length of the object. The MDR rotational speed of the given zone may be associated with an operational time period including the given timepoint, the operational time period determined based at least in part on the length of the object and representative of a duration of time when the object is present in the given zone.

In various embodiments, evaluating the accuracy of the virtual map includes determining an error measure of the virtual map based at least in part on comparing a predicted final timepoint at which the object was predicted to be present in the final zone with an observed final timepoint at which the presence of the object in the final zone was detected by the second photo-eye. In various embodiments, the executable instructions are further configured to, with the processor, cause the apparatus to determine whether the error measure satisfies one or more error thresholds, and responsive to a determination that the error measure satisfies the one or more error thresholds, configuring the virtual map for describing a real-time location of one or more subsequent objects within the conveyor system. In various embodiments, the MDR rotational speed of a particular zone is initialized and/or configured to be at least substantially zero for a time period during which no objects are predicted to be present in the particular zone.

According to another aspect of the present disclosure, a computer program product is provided. In an example embodiment, the computer program product may be for operating a conveyor system to transport an object disposed thereon, the conveyor system including a plurality of MDRs and having defined a sequence of zones. The computer program product includes at least one non-transitory computer-readable storage medium having computer-executable program code portions stored therein. The computer-executable program code portions are configured to cause a processor to detect a presence of an object in a first zone of the conveyor system using a first photo-eye, the first zone having a first MDR rotational speed. The computer-executable program code portions are further configured to cause a processor to generate a virtual map to describe a real-time location of the object within the conveyor system that is dynamically determined based at least in part on predicting the presence of the object in a given zone at a given timepoint based at least in part on a previously detected and/or predicted presence of the object in one or more preceding zones and a MDR rotational speed of each preceding zone. The computer-executable program code portions are further configured to cause a processor to, in accordance with the predicted presence of the object in the given zone at the given timepoint, configure a MDR rotational speed of the given zone for at least the given timepoint. The computer-executable program code portions are further configured to cause a processor to evaluate an accuracy of the virtual map responsive to detecting the presence of the object in a final zone of the conveyor system using a second photo-eye.

In various embodiments, the computer-executable program code portions are further configured to cause a processor to determine a length of the object based at least in part on the first MDR rotational speed and an elapsed time period during which the presence of the object in the first zone is detected by the first photo-eye. The MDR rotational speed of the given zone may be configured based at least in part on the length of the object. The MDR rotational speed of the given zone may be associated with an operational time period including the given timepoint, the operational time period determined based at least in part on the length of the object and representative of a duration of time when the object is present in the given zone.

In various embodiments, evaluating the accuracy of the virtual map includes determining an error measure of the virtual map based at least in part on comparing a predicted final timepoint at which the object was predicted to be present in the final zone with an observed final timepoint at which the presence of the object in the final zone was detected by the second photo-eye. In various embodiments, the computer-executable program code portions are further configured to cause a processor to determine whether the error measure satisfies one or more error thresholds, and responsive to a determination that the error measure satisfies the one or more error thresholds, configuring the virtual map for describing a real-time location of one or more subsequent objects within the conveyor system. In various embodiments, the MDR rotational speed of a particular zone is initialized and/or configured to be at least substantially zero for a time period during which no objects are predicted to be present in the particular zone.

BRIEF DESCRIPTION OF THE DRAWINGS

Reference will now be made to the accompanying drawings, which are not necessarily drawn to scale, and wherein.

DETAILED DESCRIPTION

Figure 1A:
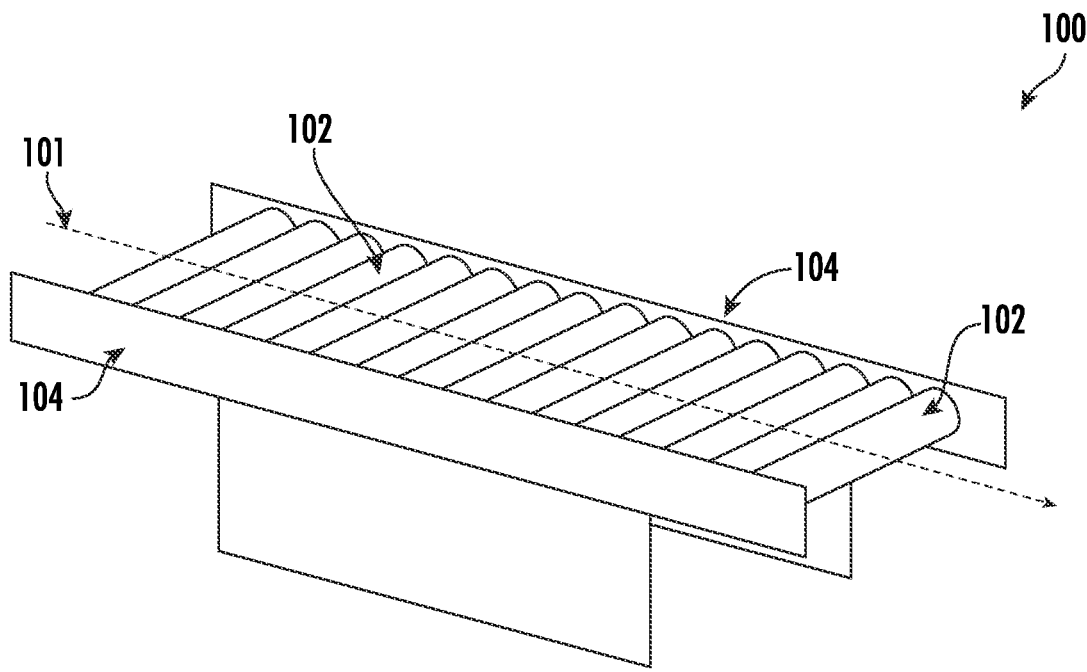
FIG. 1A provides a diagram illustrating an example conveyor system in accordance with various embodiments of the present disclosure.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Generally, conveyor systems may be used in various industrial and commercial applications to facilitate the transport of objects or cargo. In particular, motor driven roller (MDR) conveyor systems, or conveyor systems whose mechanism of transport involves the rotation of a plurality of rollers, may be used over other conveyor systems (e.g., belt conveyor systems) due to finer control over object transportation. The finer control provided by a MDR conveyor system may, for example, enable certain objects to be held at certain locations for processing tasks to be completed, while continuing to transport other objects within the MDR conveyor system. That is, different objects within a MDR conveyor system may be transported independently and/or at different speeds, if desired (e.g., to provide a separation or buffer distance between objects, to queue or accumulate objects before a certain point). In various examples, a MDR conveyor system may include a sequence of zones that define regions of independent control of object transportation.

Control and operation of different zones within a MDR conveyor system relies, in some examples, upon a determination or knowledge that an object is present in a zone, such that an action can be determined for that zone. In some example MDR conveyor systems, each zone may include a dedicated photo-eye to sense the presence of an object in each zone, and upon detection of an object in a given zone by a corresponding and dedicated photo-eye, the given zone may be controlled or activated to facilitate transport of the object. However, this creates a high dependency on photo-eyes throughout a MDR conveyor system, as every zone is dependent upon photo-eye feedback. Further, for a large number of zones, a MDR conveyor system then requires a large number of photo-eyes, thereby increasing difficulty in infrastructure implementation. For example, a substantial amount of wiring harnesses would be required, and implementation thereof would be highly time consuming. Large numbers of photo-eyes in a MDR conveyor system also causes maintenance to be tedious and, in some instances, infeasible. Maintenance of photo-eyes includes routine and frequent cleaning such that the photo-eyes may accurately detect the presence of absence of objects. Thus, failure to complete maintenance, in some examples, may lead to malfunction and interruption in operation of the MDR conveyor system.

Accordingly, various embodiments of the present disclosure address technical challenges that relate to predicting and mapping a real-time location of an object within a MDR conveyor system, and in various embodiments, the real-time location of an object is predicted with minimal photo-eye infrastructure. Various embodiments described herein may be applied to efficiently and reliably operate a sequence of zones of a MDR conveyor system without over-reliance on photo-eyes for each zone. As described by way of the examples described herein, an object can be detected by a first photo-eye positioned at an infeed point or otherwise associated with an infeed zone, or a first zone of the sequence of zones. The first photo-eye may be used to determine a length of the object, and based at least in part on the length of the object and a MDR rotational speed that is controlled, configured, set, and/or the like for the infeed zone, the object can be predicted to be in a second zone (e.g., the second zone).

In various embodiments, this may be repeatedly performed, given the length of the object and a MDR rotational speed controlled for a zone in which the object is predicted to be present, in order to predict the object being present in a subsequent zone. Thus, a real-time location of the object can be mapped to enable individual control and operation of the sequence of zones. In various embodiments, the object can again be detected by a second photo-eye positioned at a discharge point, and this empirical detection may be used to verify or evaluate the accuracy of the preceding predictions of object's location with respect to the sequence of zones. For example, discrepancies between the object's expected or predicted arrival to a zone and the object's actual arrival to the zone may arise due to material slippage and contact with the rollers for the MDR conveyor system, inertia and/or weight of the object, and/or the like. These factors may then be learned through empirically detecting the object with the second photo-eye at the discharge point and re-configuring object location predictions to account for these factors. Thus, this verification or evaluation may then be used to improve the accuracy of future predictions for objects that follow.

FIG. 1A illustrates a perspective view of an example MDR conveyor system 100 that is configured to transport an object along a transportation path 101. The transportation path 101 generally defines a path through which an object may be transported from an infeed point to a discharge point. That is, in various examples, the transportation path 101 may extend from an infeed point at one end to a discharge point at another end. The infeed point may refer to a location at which the MDR conveyor system 100 receives objects for transportation. For example, an operator (e.g., human, manually operated, autonomous) may place an object on an upper surface of the MDR conveyor system 100 at an infeed point to allow for the object to be transported via the MDR conveyor system 100 to a discharge point through the transportation path 101. As another example, the infeed point may be positioned at and/or substantially near a discharge point of a preceding conveyor system, such that objects transported to the infeed point by the preceding conveyor system can be directly transported further to the discharge point of the MDR conveyor system 100 through the transportation path 101.

In various examples, the transportation path 101 may be at least substantially linear; that is, the MDR conveyor system 100 is configured to directly transport objects in a substantially straight path from an infeed point to a discharge point. In other various examples, the transportation path 101 may be non-linear and may include various turns, curves, diverting points, intersections, and/or the like. For instance, the MDR conveyor system 100 may be configured to have a non-linear transportation path due to physical and/or environmental constraints, such as various obstacles and infrastructure within a warehouse. Similarly, the MDR conveyor system 100 may be configured to have a non-linear transportation path such that objects may be transported near and past various environmental points, for example, where operator stations may be positioned to perform various processing tasks on the transported objects. It will be understood, however, that transportation of objects near and past various environmental points is not limited to MDR conveyor systems 100 with non-linear transportation paths, and MDR conveyor systems 100 with linear transportation paths may similar be configured to transport objects near and past various environmental points.

In various examples, the transportation path 101 may have verticality, and the MDR conveyor system 100 is configured to transport an object through different elevations. Thus, in addition or alternative to horizontal variations (e.g., in a x-y plane), the transportation path 101 may include vertical variations (e.g., in a z plane).

In some example instances, the MDR conveyor system 100 is configured to be capable of reversing the transportation path 101. In doing so, the MDR conveyor system 100 may then transport objects from the previous discharge point to the previous infeed point. Similarly, a MDR conveyor system 100 having various intersections and/or diverting points may include multiple transportation paths 101 that extend through different segments of the MDR conveyor system 100 connected at said intersections and/or diverting points. In various example embodiments, the MDR conveyor system 100 is configured to transport different objects along different transportation paths 101 through various intersections and/or diverting points, such as for sorting tasks. Thus, while FIG. 1A illustrates one transportation path 101 for the MDR conveyor system 100, it will be understood that a MDR conveyor system 100 may be configured for any number of transportation paths 101 that may be linear and/or non-linear.

As illustrated, the MDR conveyor system 100 comprises a plurality of rollers 102 positioned along the transportation path 101. A roller 102 may be substantially cylindrically-shaped, and a roller may include a central rotational axis, a length along said axis, and a radius from the central rotational axis. An outer cylindrical surface of a roller 102 is configured to interface with an object disposed on the MDR conveyor system 100, or tangentially above the roller 102, and to translate the object in the transportation path 101 through rotation of the roller 102 about its central rotational axis. In some examples, the roller 102 is configured to interface and translate objects using a coating or a material on the outer cylindrical surface that is configured with a high friction coefficient.

Specifically, the plurality of rollers 102 of the MDR conveyor system 100 are positioned along the transportation path 101 such that the central rotational axis of each roller 102 is at least substantially perpendicular to the transportation path. Understood otherwise, the transportation path 101 of a MDR conveyor system 100 may be defined as a path (e.g., linear, non-linear) that is at least substantially perpendicular to the central rotational axes of the plurality of rollers 102 of the MDR conveyor system 100.

The plurality of rollers 102 of the MDR conveyor system 100 may be positioned between at least two sidewalls 104 that generally define a roller housing. Each roller 102 may be secured a sidewall 104 at each respective end such that translational movement of each roller 102 in significantly restricted. Thus, each roller 102 may be limited due only rotational movement about respective central rotational axes, as each roller 102 is secured to and between the at least two sidewalls 104. A roller 102 may be fixedly secured between the at least two sidewalls 104 at either end of its central rotational axis. In some examples, a roller 102 comprises an axle, rod, and/or the like defining its central rotational axis, and said axle, rod, and/or the like is secured to the at least two sidewalls 104.

In various embodiments, the at least two sidewalls 104 and the lengths of the plurality of rollers 102 (e.g., that span between the at least two sidewalls 104) are configured based at least in part on a width of the objects to be transported by the MDR conveyor system 100. For instance, a MDR conveyor system 100 to be used for transporting parcels limited to a maximum width and/or dimension, the at least two sidewalls 104 and the lengths of the plurality of rollers 102 may be at least greater than said maximum width and/or dimension. With the plurality of rollers 102 being positioned between the sidewalls 104, it may be appreciated that the sidewalls 104 extend at least substantially parallel with the transportation path 101.

Figure 1B:
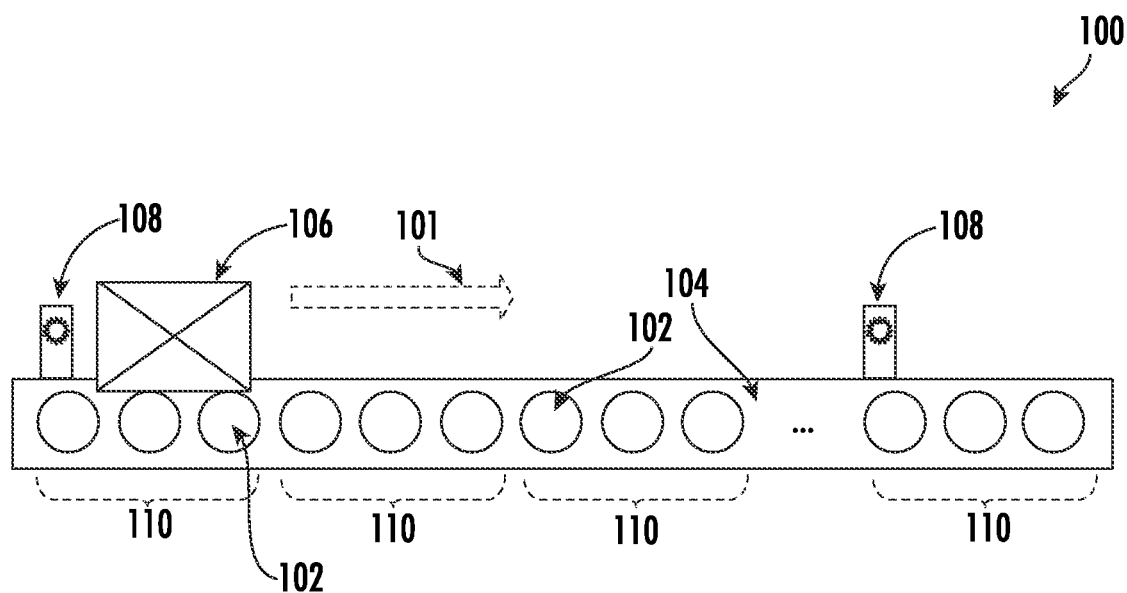
FIG. 1B provides a diagram illustrating example operation of a conveyor system to transport an object disposed thereon, in accordance with various embodiments of the present disclosure.
Figure 2:
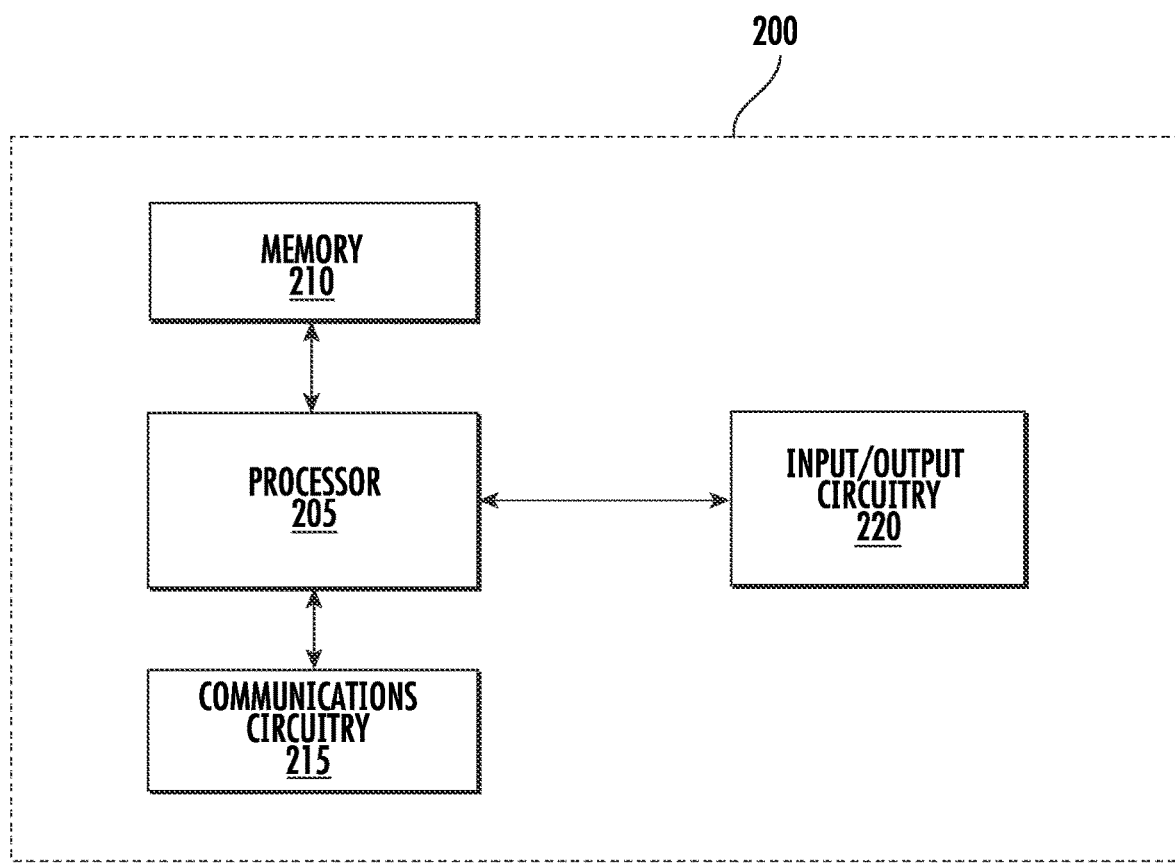
FIG. 2 schematically illustrates an exemplary apparatus for implementing various embodiments of the present disclosure.

Referring now to FIG. 1B, a cross-sectional view of an example MDR conveyor system 100 parallel with the transportation path 101 is illustrated. FIG. 2 illustrates an object 106 that may be transported along the transportation path 101 through the rotation of a plurality of rollers 102, and as illustrated, the object 106 tangentially interfaces with the plurality of rollers 102. Specifically, the object 106 interfaces with the plurality of rollers 102 by resting above the plurality of rollers 102.

Again, it should be understood that, while FIG. 2 illustrates a transportation path 101 that is parallel with the cross-sectional view, various example MDR conveyor systems 100 may be configured with transportation paths 101 that are non-linear and that may include any number of turns, curves, diverting points, intersections, and/or the like. By extension, the plurality of rollers 102 of the MDR conveyor systems 100 may not necessarily be oriented to be parallel with each and every other roller 102; that is, the plurality of rollers 102 may be positioned at varying angles (although not explicitly illustrated) relative to each other to facilitate any transportation path 101 (e.g., a nonlinear transportation direction).

As shown in the cross-sectional view of FIG. 1B, the plurality of rollers 102 may be positioned with a separation distance between each roller 102 in order to facilitate rotation of each roller 102 and in order to prevent contact between the rollers 102. In some embodiments, the separation distance between each roller 102 is at least substantially constant or uniform throughout the plurality of rollers 102. The separation distance between each roller 102 may preferably be less than a length of prospective objects to be transported by the MDR conveyor system 100 such that an object tangentially interfaces with more than one roller 102 while being transported by the MDR conveyor system 100.

Although not explicitly illustrated, rotation of the plurality of rollers 102 about their respective central rotational axes may be controlled via motors configured to cause rotation of one or more of the plurality of rollers 102. In various embodiments, the MDR conveyor system 100 comprises one or more motors that act on one or more rollers 102 to cause their rotation, and specifically, at least a subset of the plurality of rollers 102 may be actively acted upon by motors for rotation. In such examples, the remaining rollers 102 may be banded, connected, tied, and/or the like to rollers 102 that are actively acted upon by motors, such that the remaining rollers 102 may passively rotate. That is, in various example embodiments, the MDR conveyor system 100 may not include a motor for each roller 102; however, one or more motors of the MDR conveyor system 100 can be operated to cause rotation of the plurality of rollers 102 throughout the MDR conveyor system 100.

In some examples, a motor may specifically act upon a roller 102 through interfacing with the axle, rod, and/or the like defining the central rotation axis of the roller 102 and cause said axle, rod, and/or the like to rotate. The motors throughout the MDR conveyor system 100 may be housed within, extended through, positioned substantially near, and/or the like the sidewalls 104, since the axles of the rollers 102 are attached at the sidewalls 104.

In various embodiments, the motors of a MDR conveyor system 100 are unidirectional and are configured to cause either clockwise or counter-clockwise rotation of the rollers 102. Further, multiple motors of a MDR conveyor system 100 may be operated to apply rotation of rollers 102 in a consistent direction, such that the plurality of rollers 102 of the MDR conveyor system 100 may either all rotate clockwise or rotate counter-clockwise. In some embodiments, the MDR conveyor system 100 may include bidirectional motors. Using bidirectional motors, the rotation of the plurality of rollers 102 may be reversed (e.g., from clockwise to counter-clockwise, and vice versa), also causing reversal of the transportation path 101.

As illustrated in FIG. 1B, the MDR conveyor system 100 may further include photo-eyes 108. A photo-eye 108 may refer to any device, camera, sensor, and/or the like configured to detect at least the presence of an object (e.g., object 106 being transported) that is positioned near (e.g., within some threshold distance) of the photo-eye 108. That is, a photo-eye 108 may be associated with a range or a threshold distance within which the photo-eye 108 may detect at least the presence of an object with accuracy.

Generally, a photo-eye 108 may involve light-based detection and may include an emitter and a receiver, the emitter configured to emit light or some like signal and the receiver configured to detect the light or like signal emitted by the emitter. The photo-eye 108 may then be configured to detect the presence of objects within its range based at least in part on a difference in the light or signal detected by the receiver. For instance, the light may be obstructed, reflective, refracted, and/or the like by an object positioned near the photo-eye 108, and the light may then be detected by the receiver. In various embodiments, the photo-eyes 108 of a MDR conveyor system 100 may be through-beam photo-eyes, retro-reflective photo-eyes, diffuse-reflective photo-eyes, and/or the like, which each involve light-based detection.

The receiver and emitter for a through-beam photo-eye may be positioned opposite to each other, for example, in different sidewalls 104, with the emitter directly transmitting light to the receiver. The through-beam photo-eye is configured to detect objects based at least in part on objects obstructing the light transmitted directly from the emitter to the emitter.

A retro-reflective photo-eye includes a retroreflector positioned opposite to both the emitter and the receiver, for example, with the emitter and the receiver being positioned in one sidewall 104 and the retroreflector being positioned in another sidewall 104. The retro-reflective photo-eye may then detect an object positioned between the emitter/receiver and the retroreflector based at least in part on the object obstructing the light from being reflected by the retroreflector to the receiver and/or based at least in part on the object reflecting the light away from the receiver. In some examples, a retro-reflective photo-eye may have less accuracy than a through-beam photo-eye, but may be uniquely adapted to detect objects with some level of transparency.

A diffuse-reflective photo-eye includes the emitter and the receiver positioned within the same housing (e.g., at one sidewall 104), and a diffuse-reflective photo-eye may detect objects based at least in part on the objects reflecting light emitted by the emitter to the reflector. However, the detection accuracy of a diffuse-reflective photo-eye may be relatively lower, as different objects may reflect light differently based at least in part on their surface characteristics.

In various embodiments, a photo-eye 108 of a MDR conveyor system 100 may be a camera or an image capture device that is configured to detect the presence of objects. For instance, the camera or image capture device may be calibrated with an image in which no object is present and may determine based at least in part on real-time capture of images whether an object is present or not. As another non-limiting example, a photo-eye 108 of a MDR conveyor system 100 may comprise an X-ray device, a computed tomography (CT) device, and/or another device configured for radiation-based object detection. In various examples in which a photo-eye 108 is configured for radiation-based object detection, the photo-eye may be further configured to examine the internal characteristics (e.g., stored objects) within a detected object. In various embodiments, a photo-eye 108 may detect, with the presence of an object, other aspects of an object, including a color, a classification, a surface material, and/or the like. In some example instances, objects transported by the MDR conveyor system 100 may include labels, tags, and/or the like, and photo-eyes 108 of the MDR conveyor system 100 may be configured to detect and/or recognize such labels, tags, and/or the like.

Various embodiments of the present disclosure relate to a MDR conveyor system 100 comprising an infeed photo-eye, or a photo-eye 108 positioned substantially near the infeed point at which objects 106 may be provided to the MDR conveyor system. In some example embodiments described herein, the MDR conveyor system 100 further includes a discharge photo-eye, or a photo-eye 108 positioned substantially near the discharge point to which the MDR conveyor system is configured to transport objects. In various embodiments, the infeed photo-eye and the discharge photo-eye may be any type of photo-eye, including the photo-eyes 108 described above, and may be configured to detect objects using light-based detection techniques, image-based detection techniques, radiation-based detection techniques, and/or the like. The infeed photo-eye and the discharge photo-eye (and/or components thereof) may be positioned within, attached to, located substantially near, and/or the like the sidewalls 104 of the MDR conveyor system. Thus, for example, the infeed photo-eye and the discharge photo-eye to not obstruct the transportation path 101.

Generally, photo-eyes 108 of the MDR conveyor system 100 may be oriented to be at least substantially perpendicular to the transportation path 101, such that photo-eyes 108 are configured to detect objects that are positioned along the transportation path 101 at approximately the same length of the MDR conveyor system 100. Thus, for example, a photo-eye 108 positioned at an infeed zone is oriented to detect objects within the infeed zone by being oriented to be at least substantially perpendicular to the transportation path 101. Thus, a photo-eye 108 positioned at a particular zone may not be oriented to detect objects present in zones other than the particular zone.

In various embodiments, an object's real-time location within the MDR conveyor system is predicted and mapped based at least in part on an initial detection of the object using the infeed photo-eye. Further, in some example embodiments, the prediction and mapping of the object's real-time location is verified and re-configured from another detection of the object using the discharge photo-eye. Various embodiments of the present disclosure provide various technical advantages in requiring only at least one photo-eye 108 at the infeed point for accurate prediction and mapping of objects being transported by a MDR conveyor system 100, thereby reducing the required amount of photo-eye wiring, infrastructure, and maintenance for operation of the MDR conveyor system 100. Various embodiments of the present disclosure can also include at least one photo-eye 108 at the discharge point to improve and maintain accuracy of the object location predictions.

FIG. 1B further illustrates the MDR conveyor system 100 being portioned into a sequence of zones 110 along the transportation path 101. As described herein, a zone of the MDR conveyor system 100 may refer to a region or length of the transportation path 101 within which operation of the MDR conveyor system 100 can be independently controlled. For instance, rollers 102 positioned within a first zone 110 may be operated to rotate at a rotational speed different than rollers 102 positioned within another zone 110 in order to accomplish various transportation criteria, directives, objectives, and/or the like (e.g., creating a buffer distance between a line of objects 106, accumulating a number of objects at a certain location for a processing task, and/or the like). Accordingly, in various example embodiments, each zone 110 may be associated with at least one motor, such that each zone 110 can be controlled with a MDR rotational speed by at least one corresponding motor.

Independent control of a zone 110 is primarily effective with an object being present in the zone 110, such that the object can be transported at a controlled speed within the zone 110. However, as discussed, infeasibilities exist with implementing a photo-eye at each zone 110 of a MDR conveyor system 100, including difficult wiring, infrastructure and maintenance of a large number of photo-eyes. Various embodiments of the present disclosure provide for accurate prediction and mapping of an object's location with respect to the zones 110 using at least one photo-eye 108 at the infeed point, and in some example embodiments, another photo-eye 108 at the discharge point to verify prediction accuracy. Thus, various embodiments provide technical advantages in reducing dependency of control over the zones 110 on photo-eye feedback.

In some examples, a zone 110 may be defined along the transportation path 101 to include a number of rollers 102. For instance, in the illustrated embodiment, each zone includes three rollers 102. However, it will be understood that, in other non-limiting examples, different zones may have different numbers of rollers 102. As discussed, the rollers 102 that are associated with, belong to, and/or are positioned within a zone 110 are operated to rotate at the same MDR rotational speed. In one example embodiment, a zone may include at least one roller 102 actively acted upon by a motor and configured to cause other rollers 102 to "passively" rotate (e.g., via banding, ties, connections, and/or the like). Thus, generally, each zone can be associated with a MDR rotational speed, which can be operated and controlled, in various embodiments. In some other examples, the sequence of zones 110 may be defined using empirical length measurements along the transportation path 101 (e.g., a first zone spans the first ten meters of the transportation path 101 and a second zone spans the next seven meters of the transportation path 101, as a non-limiting demonstrative example).

In various embodiments, the length of each zone 110 along the transportation path 101 may be based at least in part on a length of the object(s) 106 to be transported (or being transported) by the MDR conveyor system 100. For instance, in some non-limiting examples, each zone 110 is defined with a length longer than a length of the object(s) 106 to be transported such that each object can be transported independently through independent control of each zone 110. In various example embodiments, the sequence of zones 110 of the MDR conveyor system 100 may be dynamically defined based at least in part on a detected length of each object 106 being transported by the MDR conveyor system 100. In doing so, a MDR conveyor system 100 may be portioned into a sequence of zones 110 specific to each object 106, with the MDR conveyor system 100 transporting a plurality of objects 106 with different lengths.

Various embodiments described herein relate to prediction and mapping of a real-time location of an object 106 with respect to a sequence of zones 110. For instance, various embodiments involve predicting a zone 110 in which the object 106 is present at the current time point. Further, in various embodiments, the object 106 may be predicted to be in other zones 110 at subsequent timepoints based at least in part on the MDR rotational speed of the zone 110 in which the object 106 is predicted to be present and a length of the object. In some example embodiments, the predicted timepoints at which the object 106 is predicted to reach each zone 110 may be dynamically updated while the MDR rotational speeds in each zone 110 are controlled to fulfill various transportation objectives (e.g., creating a buffer distance between a line of objects 106, accumulating a number of objects at a certain location for a processing task, and/or the like).

In various embodiments, a first zone 110 of the MDR conveyor system 100 may be referred to as an infeed zone, while a final zone 110 of the MDR conveyor system 100 may be referred to as a discharge zone. In various embodiments, an object 106 may be detected first at the infeed zone by an infeed photo-eye, and based at least in part on the object 106 being detected at the infeed zone, a MDR rotational speed (e.g., a speed at which the rollers 102 rotate) for the infeed zone is controlled (e.g., to move the object 106 at a desired translation speed, to stop the object 106 at the infeed zone). According to an elapsed time that the object 106 is detected by the infeed photo-eye at the infeed zone and the controlled MDR rotational speed within the infeed zone, a length of the object 106 can be determined.

A virtual map can then be generated, with the virtual map being configured to describe a predicted location of the object 106 within the MDR conveyor system 100 in real-time and/or at a plurality of given timepoints. Using the determined length of the object 106 and the MDR rotational speed of the infeed zone, the object's presence in a second zone can be predicted. Similarly, upon prediction that the object is currently present in the second zone, a MDR rotational speed for the second zone is configured. Generally, using the determined length of the object 106 and the controlled MDR rotational speed in each zone in which the object 106 is present over time, the object's presence in each subsequent zone 110 can be predicted and mapped via the virtual map, and control of the MDR rotational speed in each subsequent zone 110 is enabled without having a photo-eye present in each subsequent zone 110.

Figure 1C:
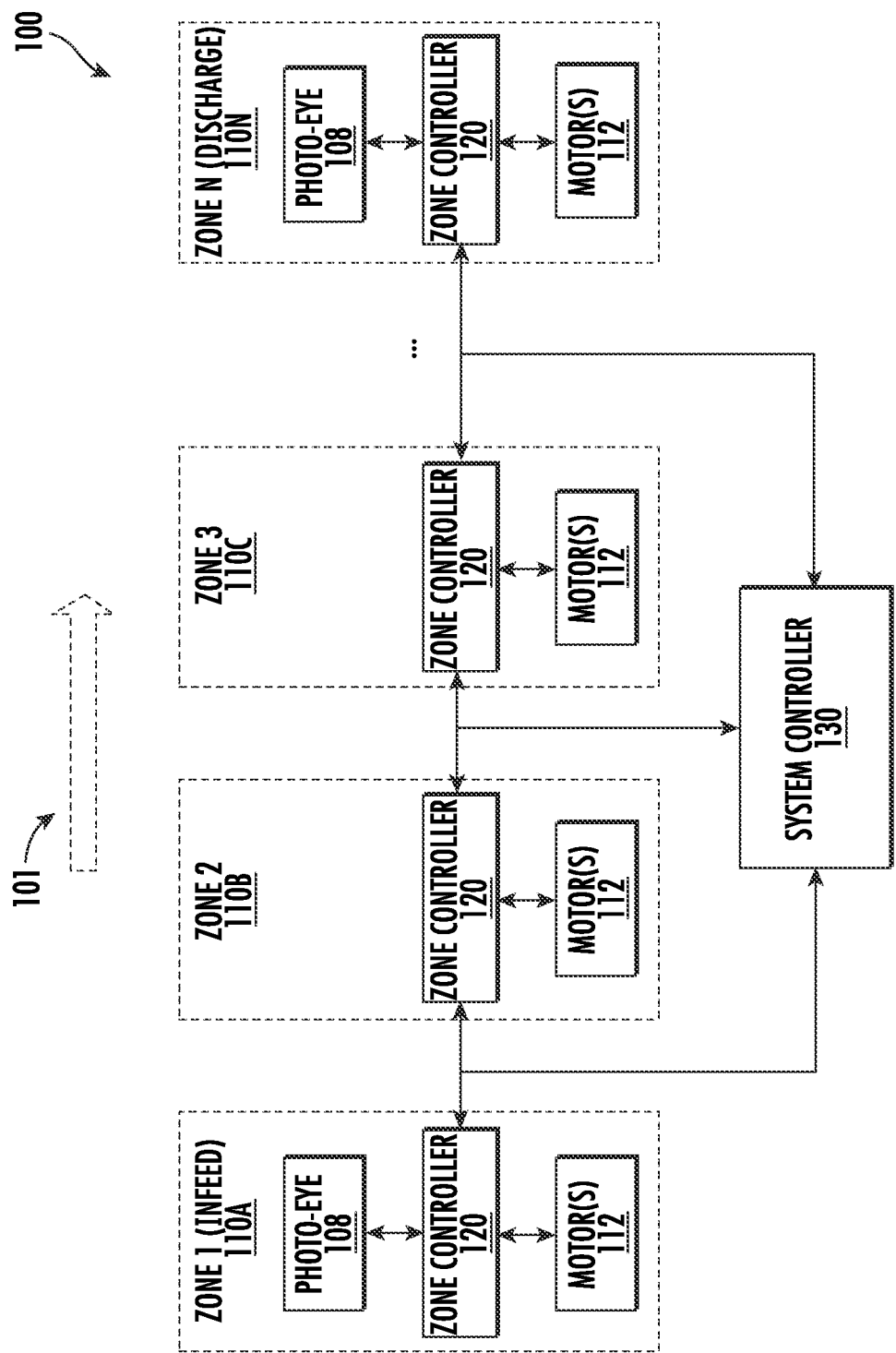
FIG. 1C provides a diagram illustrating an example architecture of a conveyor system to efficiently and reliably operate a sequence of zones of a conveyor system to transport an object disposed thereon, in accordance with various embodiments of the present disclosure.

Referring now to FIG. 1C, a schematic diagram illustrating an example zone architecture of a MDR conveyor system 100 is provided. In particular, FIG. 1C illustrates one example of a zone architecture involving a number of zone controllers 120 and a system controller 130. Generally, a zone controller 120 may be specific to a zone 110, in various embodiments, and may be configured to operate one or more motors 112 of the zone 110 to cause rollers 102 of the zone 110 to have a desired MDR rotational speed. For example, a zone controller 120 may be configured to cause rollers 102 of a corresponding zone 110 to have a desired MDR rotational speed to accomplish various transportation objectives, such as creating a buffer between different objects or accumulating a number of objects at a location. In various embodiments, a zone controller 120 is configured to control the MDR rotational speed of a corresponding zone 110 responsive to an object 106 being present within the corresponding zone 110, and various embodiments enable the zone controllers 120 of a MDR conveyor system 100 to determine that objects 106 are present in corresponding zones 110 with reduced reliance upon photo-eyes 108.

In the illustrated embodiment, for example, intermediate zones 110 (e.g., zone 110B and zone 110C sequentially between the infeed zone 110A and the discharge zone 110N) do not include photo-eyes 108, and zone controllers 120 corresponding to the intermediate zones 110 are configured to determine (e.g., predict, receive a prediction of) the presence of objects 106 in each intermediate zone 110 with photo-eyes 108 being absent from the intermediate zones 110. As shown in FIG. 1C, the infeed zone 110A may include a photo-eye 108 for initial detection of an object 106 being transported by the MDR conveyor system, with subsequent prediction(s) of object location being based at least in part on the initial detection using the photo-eye 108 at the infeed zone 110A. FIG. 1C further illustrates a photo-eye 108 at the discharge zone 110N, and as previously discussed, this discharge photo-eye may be used to detect the object 106 again for verification of the intermediate predictions of object location (and re-configuration of said predictions if needed). For example, the predicted locations of the object with respect to the zones 110 may deviate from the actual location of the object due to various factors including material slippage and object inertia, and to account for and learn these factors, detection of the object by the discharge photo-eye can be used to re-configure the predictions. Thus, in various embodiments, a reduced number of photo-eyes 108 are required for operation of the plurality of zones 110, as demonstrated in FIG. 1C.

To accomplish the reduced dependency on photo-eyes 108 throughout the MDR conveyor system 100, zone controllers 120 are configured to communicate with each other and specifically may transmit and receive various data such that object locations can be predicted and mapped. For instance, the zone controller 120 corresponding to the infeed zone 110A may communicate to zone controllers 120 corresponding to zones 110 that are downstream that an object 106 has been detected at the infeed zone 110A using the first photo-eye 108, in various embodiments. In particular, zone controllers 120 may each communicate a MDR rotational speed controlled for each corresponding zone 110, as object location prediction is based at least in part on the MDR rotational speed of the zone 110 in which the object is present (or predicted to be present). Thus, in an example non-limiting scenario, a zone controller 120 corresponding to a zone 110 in which an object 106 is predicted to be present may communicate the MDR rotational speed (or the resulting translational speed of the object 106) and the length of the object 106 to a downstream zone controller 120 so that the downstream zone controller 120 may predict whether or when the object is present in its corresponding zone 110. Generally, MDR rotational speeds of various zones may be communicated across multiple zone controllers 120, such that any and/or all zone controllers 120 may predict the location of the object.

That is, in some example embodiments, one or more of the zone controllers 120 are configured to predict and map the location of the object 106 in accordance with various embodiments of the present disclosure. For example, one or more of the zone controllers 120 may be configured to perform various operations for predicting and mapping the location of the object 106, and at different timepoints, different zone controllers 120 may perform such operations to predict and map the location of the object 106.

Additionally or alternatively, the MDR conveyor system 100 comprises a system controller 130, as illustrated in FIG. 1C, that is configured to communicate with each zone controller 120. The system controller 130 may be configured to predict and map the location of the object 106 in accordance with various embodiments of the present disclosure. In such example embodiments, the system controller 130 may indicate and/or provide the predicted location (e.g., a particular zone 110) at which the object 106 is predicted to be present to the plurality of zone controller 110, the zone controller 110 corresponding to the predicted location, one or more zone controllers 110 downstream of the predicted location, and/or any combination and number of zone controllers 110.

Similarly, the system controller 130 may be configured to determine a MDR rotational speed for each zone 110 based at least in part on the predicted location of the object 106 and in accordance with various transportation objectives, and the system controller 130 may then communicate the determined MDR rotational speeds to each zone controller 120 to operate the motors 112. As a further non-limiting example, although not explicitly illustrated, the system controller 130 may be configured to directly receive data from the infeed photo-eye and the discharge photo-eye and to directly operate the motors 112 across the sequence of zones 110, circumventing the zone controllers 120.

In various embodiments, the system controller 130 may provide an endpoint through which a user or operator of the MDR conveyor system 100 may be provided with the predicted location of objects 106 being transported by the MDR conveyor system 100 and through which the user or operator of the MDR conveyor system 100 may manually control operation of the MDR conveyor system 100. For example, the virtual map configured to describe the predicted location of an object 106 in real-time and/or at given timepoints may be provided for display to a user via the system controller 130. In various example embodiments, the user may provide feedback to the system controller 130 based at least in part on real observations of the location of the object 106, and the system controller 130 and/or various zone controllers 120 may be configured to re-configure the virtual map and/or various prediction parameters based at least in part on the feedback provided by the user, similar to feedback provided by the detection of the object 106 by the discharge photo-eye.

Referring now to FIG. 2, an exemplary block diagram of an apparatus 200 configured for performing operations for predicting and mapping a real-time location of an object 106 with respect to a sequence of zones 110 of a MDR conveyor system 100. In various embodiments, the apparatus 200 may be further configured for controlling the operation of the sequence of zones 110 (e.g., controlling a MDR rotational speed for each zone 110) based at least in part on the predicted location of the object 106, or predicted presence or absence of the object 106 in each zone 110. For example, the apparatus 200 may be embodied by, may comprise, may be communicatively coupled to, may remotely control, and/or the like one or more zone controllers 120, in some example embodiments.

In other example embodiments, the apparatus 200 may communicate the predicted and mapped location of the object within the MDR conveyor system 100 to one or more zone controllers 120, and each zone controller 120 may control one or more associated motors 112 within a zone 110 based at least in part on the predicted location of the object. For example, the apparatus 200 may be embodied by, may comprise, may be communicatively coupled to, may remotely control, and/or the like the system controller 130, in some example embodiments.

As illustrated in FIG. 2, the apparatus 200 may comprise a processor 205, a memory 210, communications circuitry 215, and input/output circuitry 220. The apparatus 200 may be configured to execute (e.g., perform) one or more of the various operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus 200 should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 provide or supplement the functionality of particular circuitry. For example, the processor 205 may provide processing functionality, the memory 210 may provide storage functionality, the communications circuitry 215 may provide network interface functionality, and the like.

In some embodiments, the processor 205 (and/or co-processor or any other processing circuitry assisting or otherwise associated with the processor) may be in communication with the memory 210 via a bus for passing information among components of the apparatus. The memory 210 may be non-transitory and may include, for example, one or more volatile and/or non-volatile memories. For example, the memory 210 may be an electronic storage device (e.g., a computer readable storage medium). In various embodiments, the memory 210 may be configured to store information, data, content, applications, instructions, or the like, for enabling the apparatus 200 to carry out various functions in accordance with example embodiments of the present disclosure. It will be understood that the memory 210 may be configured to store partially or wholly any electronic information, data, data structures, embodiments, examples, figures, processes, operations, techniques, algorithms, instructions, systems, apparatuses, methods, look-up tables, or computer program products described herein, or any combination thereof. For example, the memory 210 may be configured to store footprints that represent or describe frequency spectrum data at reference positions.

The processor 205 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 205 may be configured to execute instructions stored in the memory 210 or otherwise accessible to the processor 205. Alternatively, or additionally, the processor 205 may be configured to execute hard-coded functionality. As such, whether configured by hardware or software methods, or by a combination thereof, the processor 205 may represent an entity (e.g., physically embodied in circuitry) capable of performing operations according to an embodiment of the present disclosure while configured accordingly. Alternatively, as another example, when the processor 205 is embodied as an executor of software instructions, the instructions may specifically configure the processor to perform the algorithms and/or operations described herein when the instructions are executed.

The communications circuitry 215 may be a device or circuitry embodied in either hardware or a combination of hardware and software that is configured to receive and/or transmit data from/to a network and/or any other device, circuitry, or module in communication with the apparatus 200. For example, the communications circuitry 215 may be configured to communicate with one or more computing devices via wired (e.g., USB) or wireless (e.g., Bluetooth, Wi-Fi, cellular, and/or the like) communication protocols. In an example embodiment, the apparatus 200 communicates with one or more zone controllers 120 and/or a system controller 130 for predicting and mapping a location of the object 106 with respect to the sequence of zones 110. For example, the apparatus 200 may transmit and/or receive, via communications circuitry 215, a determined length of the object 106 and a MDR rotational speed controlled for a zone 110 in which the object 106 is present (or predicted to be present).

In some embodiments, the apparatus 200 may include input/output circuitry 220 that may, in turn, be in communication with the processor 205 to provide output to the user and, in some embodiments, to receive input such as a command provided by the user. The input/output circuitry 220 may comprise a user interface, such as a graphical user interface (GUI), and may include a display that may include a web user interface, a GUI application, a mobile application, a client device, or any other suitable hardware or software. In some embodiments, the input/output circuitry 220 may also include a display device, a display screen, user input elements, such as a touch screen, touch areas, soft keys, a keyboard, a mouse, a microphone, a speaker (e.g., a buzzer), a light emitting device (e.g., a red light emitting diode (LED), a green LED, a blue LED, a white LED, an infrared (IR) LED, an ultraviolet (UV) LED, or a combination thereof), or other input-output mechanisms. The processor 205, input/output circuitry 220 (which may utilize the processing circuitry), or both may be configured to control one or more functions of one or more user interface elements through computer-executable program code instructions (e.g., software, firmware) stored in a non-transitory computer-readable storage medium (e.g., memory 210). For instance, the apparatus 200 may be configured to provide a virtual map for an object 106 for display to a user via input/output circuitry 220. As a further example, the apparatus 200 may receive user input via input/output circuitry 220 that describes an observed or empirical location of the object 106 with respect to the sequence of zones 110.

In some embodiments, the apparatus 200 does not interact directly with the user, and the apparatus 200 may generate user interface data for display via input/output circuitry of one or more other devices with which one or more users directly interact and transmit the generated user interface data to one or more of those devices. For example, the apparatus 200, using user interface circuitry may generate user interface data for display by one or more display devices and transmit the generated user interface data to those display devices.

In various embodiments, the input/output circuitry 220 is configured for communicating with a photo-eye 108, such as in example embodiments in which the apparatus 200 is embodied by a zone controller 120. In particular, the apparatus 200 may be embodied by a zone controller 120 corresponding to the infeed zone 110A or corresponding to the discharge zone 110N and is configured to detect the presence or absence of an object 106 in the infeed zone 110A or the discharge zone 110N based at least in part on data received from a photo-eye 108 via the input/output circuitry 220. In an alternative embodiment, the apparatus 200 is embodied by the system controller 130, and is configured to communicate with a photo-eye 108 via input/output circuitry 220. The apparatus 200 may be communicatively coupled with a photo-eye 108 and may receive photo-eye data, such as an intensity of light or signal received at the receiver of the photo-eye 108, an image (e.g., optical, X-ray, radiation-based) of a corresponding zone 110, and/or the like. In various embodiments, the input/output circuitry 220 comprises circuitry that is configured to receive, process, and transmit photo-eye data.

The input/output circuitry 220 may be configured for communicating with one or more motors 112 for one or more zones 110. For example, when embodied by a zone controller 120, the apparatus 200 communicates with one or more motors 112 associated with the zone 110 corresponding to the zone controller 120 via input/output circuitry 220. As another non-limiting example, the apparatus 200 is embodied by the system controller 130 and is configured to communicate with motors 112 for various zones 110 via input/output circuitry 220.

Specifically, the apparatus 200 may be configured to operate a motor 112 via input/output circuitry 220 to cause rotation of rollers 102. In various embodiments, the input/output circuitry 220 comprises circuitry that is configured to operate the motors 112 in communication with the apparatus 200. For example, the apparatus 200 may determine a particular rotational speed (e.g., in units of revolutions per minute, or rpm), and input/output circuitry 220 is configured to drive a motor 112 to cause rollers 102 to rotate at the particular rotational speed.

In various embodiments, the input/output circuitry 220 may be configured to execute one or more of the operations described herein at two or more instances, so as to facilitate the receiving, processing, generating, and/or transmitting of data describing the length of objects 106 and multiple MDR rotational speeds for various zones 110 over time. In various embodiments, the input/output circuitry 220 may be configured to store at least a portion of such data (e.g., in memory 210, in a database) corresponding to one or more of the operations described herein as historical system data that, for example, may be associated with one or more instances (e.g., an installation instance, a particular runtime). In such an exemplary circumstance, the apparatus 200 may be configured to access at least a portion of the historical system data (e.g., via the memory 210) in order to facilitate the execution of one or more operations described herein.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Figure 3:
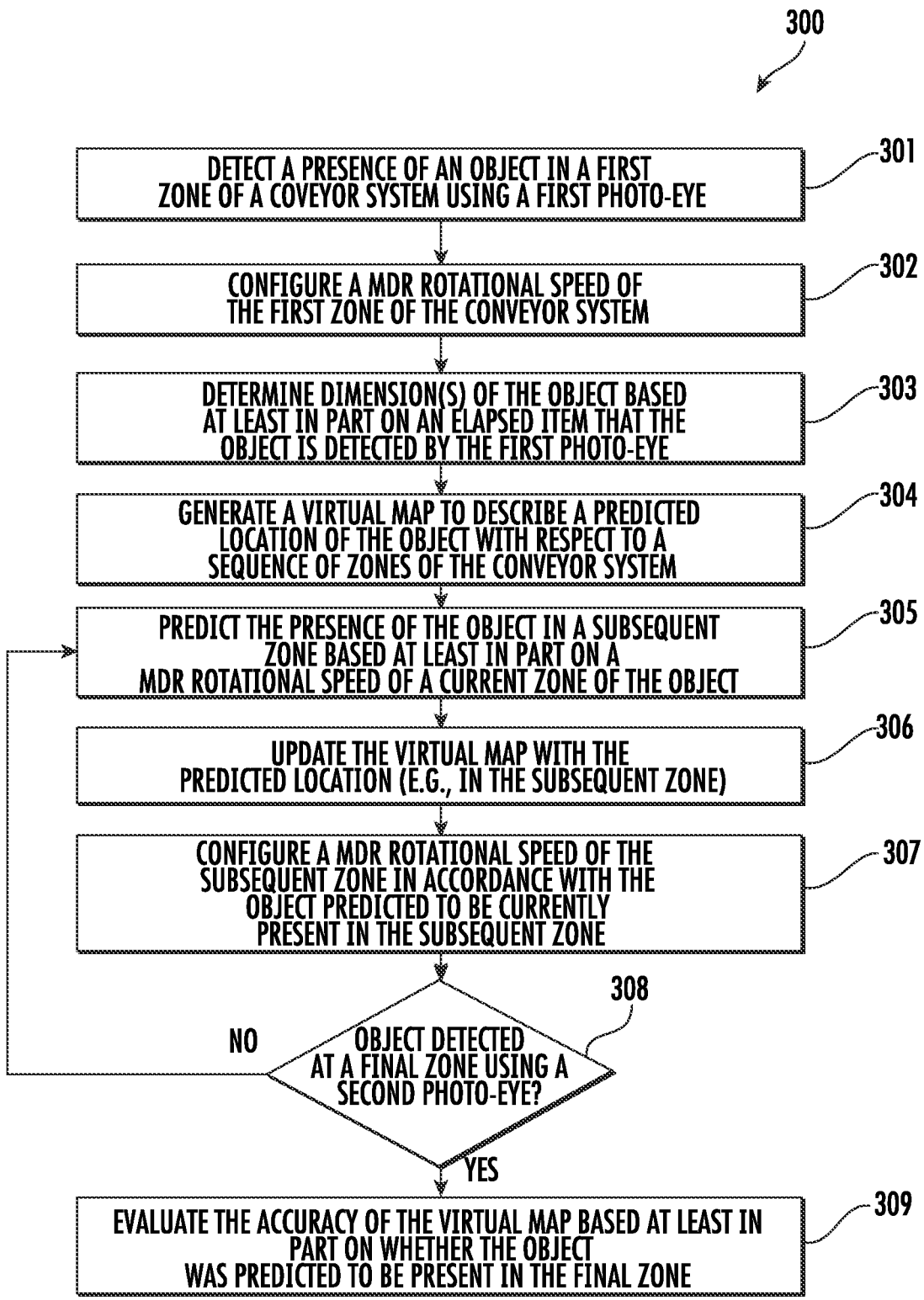
FIG. 3 illustrates a flowchart of exemplary operations performed for controlling a sequence of zones of a conveyor system, such as through predicting and mapping a location of an object within the conveyor system, in accordance with various embodiments of the present disclosure.

Referring now to FIG. 3, a flowchart 300 describing various example operations for predicting and mapping a location of an object 106 with respect to a sequence of zones 110, thereby enabling independent zone control for operation of a MDR conveyor system 100. In particular, flowchart 300 describes various example operations for predicting and mapping object locations with a MDR conveyor system 100 with a minimal number of photo-eyes 108 (e.g., at least two photo-eyes 108). In various embodiments, the example operations described by the flowchart 300 are performed by the apparatus 200, which comprises means, such as processor 205, memory 210, communications circuitry 215, input/output circuitry 220, and/or the like, for performing example operations described by flowchart 300. Various operations of flowchart 300 may be performed by the apparatus 200 as embodied by various zone controllers 120 and/or a system controller 130. For example, in some example embodiments, one or more zone controllers 120 may perform the example operations of flowchart 300 to predict and map a location of an object 106. As another example, a system controller 130 may perform the example operations of flowchart 300 to predict and map a location of an object 106.

As illustrated, flowchart 300 includes block 301, at which the apparatus 200 is configured to detect a presence of an object 106 in a first zone, or an infeed zone 110A, of a MDR conveyor system 100 using a first photo-eye 108. The object 106 may be present in the infeed zone 110A as a result of being placed at a human operator, an autonomous or semi-autonomous operator, another conveyor system, and/or the like. In some example embodiments, the MDR conveyor system 100 is configured to primarily receive objects 106 at the infeed zone 110A. Thus, it may be reasonably assumed that any objects 106 to be transported by the MDR conveyor system 100 are initially present and pass through the infeed zone 110A.

In various embodiments, detecting the presence of the object 106 in the infeed zone 110A comprises recording a first timepoint at which the object 106 was first detected. In some example embodiments, the first timepoint may be used then as a reference point for future timepoints and to determine various time durations relevant to the object's travel.

Through detecting the presence of the object 106 in the infeed zone 110A, the first photo-eye 108 may be configured to detect additional features of the object 106. For instance, the first photo-eye 108 may determine a type of the object 106, a color, a surface or packaging material, and/or the like. In a further example, the first photo-eye 108 may detect identifying features of the object 106, such as a label, a tag, and/or the like. In doing so, the apparatus 200 may be configured to classify and/or identify the object 106 upon the object 106 being detected in the infeed zone 110A. In such example embodiments, classification and/or identification of the object 106 may enable additional tasks such as tracking or object-specific processing.

Flowchart 300 further includes block 302, at which the apparatus 200 is configured to control a MDR rotational speed of the first zone, or infeed zone 110A, of the MDR conveyor system 100. That is, at block 302, the apparatus 200 may operate the infeed zone 110A based at least in part on the detection of the object 106 within the infeed zone 110A using the first photo-eye 108.

Generally, the controlled MDR rotational speed of the infeed zone 110A is based at least in part on a transportation objective associated with the MDR conveyor system 100 and/or with the object 106. For instance, a transportation objective may direct the object 106 to be transported with a given translation speed in order to reach the discharge point and/or other locations by a certain timepoint. As another non-limiting example, a transportation objective may direct the object 106 to be held or stopped within the infeed zone 110A until some condition is satisfied (e.g., a user gives an explicit start command, another object is no longer present or predicted to be present in a second zone directly following the infeed zone 110A). In various example embodiments, the zone controllers 120, including the zone controller 120 specific to the infeed zone 110A, and/or the system controller 130 are configured with control logic that dictates various transportation objectives and defines various conditional actions for the transportation of various objects 106 within the MDR conveyor system 100.

In various embodiments, a transportation objective may be defined with respect to a translation speed of the object 106. As one non-limiting example, it may be determined (e.g., by a zone controller 120 and/or a system controller 130 via control logic configured to determine a transportation objective) that the object 106 should be transported at a translation speed of thirty feet per minute (30 ft/min). Thus, in order to configure or control a MDR rotational speed of rollers 102 belonging to the infeed zone 110A, the apparatus 200 is configured to determine the MDR rotational speed based at least in part on the desired translation speed. In various examples, this conversion from translation speed of the object 106 to the MDR rotational speed of rollers 102 is based at least in part on a radius of the rollers 102, and in some instances, the rollers 102 may have a uniform radius. In various embodiments, this determination of MDR rotational speed of rollers 102 is additionally dependent upon various other weights and parameters, including a friction coefficient of the outer cylindrical surfaces of the rollers 102, a (predicted or assumed) friction coefficient of the object 106, a separation distance between each roller 102, and/or the like. In some instances, the desired translation speed of the object 106 while present in the infeed zone 110A, in accordance with one or more transportation objectives, may be dynamic over time.

Generally, the dimensions and length of the object 106 may be parameters used in determining a MDR rotational speed to apply to a zone 110 in which the object present, as well as being critical in predicting and mapping the object's location with respect to the sequence of zones. Accordingly, flowchart 300 further includes block 303, at which the apparatus 200 is configured to determine one or more dimensions of the object 106 based at least in part on an elapsed time that the object is detected by the first photo-eye 108.

In some examples, the apparatus 200 is configured to determine a length of the object 106, or a dimension of the object 106 that is at least substantially parallel to the transportation path 101. In various embodiments, the length of the object 106 is determined based at least in part on the MDR rotational speed applied to the infeed zone 110A while the object 106 is present in the infeed zone 110A and the elapsed time that the object 106 is detected by the infeed photo-eye. Specifically, based at least in part on a translation speed of the object 106 caused by the MDR rotational speed (which may be taken as the specific speed value sent to the appropriate motors 112 and/or as feedback of an actual speed value received from the motors 112 and associated sensors) and the elapsed time that the object 106 is directly detected by the infeed photo-eye. As discussed, the length of the object 106 (e.g., along the transportation path 101) may be a parameter used to subsequently predict the presence of the object 106 in downstream zones based at least in part on the MDR rotational speeds controlled for each downstream zone. Thus, in various embodiments, the determined length of the object 106 may be transmitted between various zone controllers 120 (e.g., including the zone controller 120 associated with the infeed zone 110A) and the system controller 130, as demonstrated in the context of FIG. 1C.

In some further example embodiments, other dimensions, such as a width and/or height, of the object 106 can be determined using the infeed photo-eye and/or other sensors. For example, the infeed photo-eye may be embodied, in one example embodiment, by one or more image capture devices, and the dimensions of the object 106 may be determined from image data from the one or more image capture devices. In one example embodiment, the weight of the object 106 may also be determined, predicted, and/or the like. In this example embodiment, the MDR conveyor system 100 may comprise pressure sensors, spring sensors, weight sensors, and/or the like that may detect a force exerted by the object 106 on the rollers 102 while resting on the rollers 102, and from this, a weight of the object 106.

Flowchart 300 further includes block 304, at which the apparatus 200 is configured to generate a virtual map to describe a location of the object 106 with respect to the sequence of zones 110 of the MDR conveyor system 100. In various embodiments, the virtual map may be a data object that is configured to describe the location (e.g., as detected in the infeed zone 110A and predicted for downstream zones) of the object 106. As previously discussed, the virtual map may describe a binary presence or absence of the object 106 in each zone 110, with the object 106 being present in only one zone 110, for example. As another example, the virtual map may describe a predicted time of arrival of the object 106 for each zone 110, with also an indication of a zone 110 in which the object 106 is presently detected and/or predicted to be present. In various embodiments, the virtual map may be a vector, a matrix, an array, a data structure (e.g., a graph-based structure, a tree-based structure), embeddings, and/or the like configured to describe the location of the object 106 with respect to the sequence of zones 110.

Here, at block 304, the virtual map may be initialized to indicate that the object 106 is detected at the infeed zone, or a first zone of the sequence of zones. Accordingly, the virtual map may be further initialized to indicate that the object 106 is predicted to be absent or not present in any of the downstream zones. Additionally or alternatively, a predicted time of arrival of the object 106 for each downstream zone may be determined based at least in part on the present MDR rotational speed configured for the infeed zone and the determined length of the object 106, and the virtual map is configured to indicate each predicted time of arrival. However, it will be understood that predicted times of arrival for downstream zones may dynamically change as MDR rotational speeds of various zones 110 are controlled and configured in real-time as the object 106 passes through the zones 110.

In various embodiments, generating the virtual map may further comprise providing the virtual map for display to a user, such as at the system controller 130, and the display of the virtual map may be configured to dynamically update as the location of the object 106 continues to be detected and/or predicted.

Flowchart 300 further includes block 305, at which the apparatus 200 is configured to predict the presence of the object 106 in a subsequent zone based at least in part on a MDR rotational speed of a current zone of the object. For example, while the object 106 is detected to be present in the infeed zone 110A or the first zone, the presence of the object 106 in the second zone is predicted. As another example, the presence of the object 106, or specifically the predicted time of arrival of the object 106, for each downstream zone may be predicted, at block 305.

In various embodiments, the presence of the object 106 is predicted based at least in part on the MDR rotational speed controlled for the current zone of the object 106, or the zone in which the object 106 is detected or predicted to be present. Specifically, the MDR rotational speed may be processed to determine a translational speed of the object 106 along the transportation path 101 while being transported by rollers 102 belonging to the current zone of the object 106, and the determined translational speed may be used along with the length of the object 106 and/or an elapsed time that the object 106 is present in the current zone to predict if and/or when the object 106 is present in the zone(s) 110 following the current zone.

Various embodiments provide technical advantages in predicting the presence of the object 106 in subsequent and downstream zones, as the prediction is made without explicit detection by photo-eyes at each subsequent and downstream zones. In particular, various embodiments are directed to predicting the location of the object 106 without a need for photo-eyes 108 at each zone of the MDR conveyor system 100. Thus, at block 305, the object 106 may be predicted to be present in a particular zone based at least in part on a predicted presence in a preceding zone (or a detected presence if the preceding zone is the infeed zone 110A), the MDR rotational speed controlled for the preceding zone, and the length of the object 106. In various embodiments, the prediction of object location is based at least in part on one or more weights and/or one or more parameters. For example, prediction of object location with respect to the sequence of zones 110 may be further configured to consider and factor material slippage and/or inertia of the object 106, which are defined and learned through detection of previous objects by the discharge photo-eye and comparison of the detections with respective predictions.

As described within the present disclosure, these weights and parameters may be dynamically re-configured given observations of the object's true location, such as through user input provided via the system controller 130 and/or one or more zone controllers 120 or through a second detection of the object 106 at the discharge zone 110N using the discharge photo-eye. Specifically, in various embodiments, the discharge photo-eye is a second photo-eye of the MDR conveyor system 100 and is used to verify and re-configure aspects of the object location prediction. In various embodiments, each prediction of the object location (e.g., if and/or when the object is present in a downstream zone) may be associated with a confidence score and/or an error range. For example, the object 106 may be predicted to be present in any one of three consecutive zones, or as anther non-limiting example, the object 106 may be predicted to be present in a particular zone with a degree of confidence (e.g., a percentage between 0% and 100%). Such confidence scores and/or error ranges may be based at least in part on the weights and parameters used in the object location prediction, and it may be appreciated that as feedback is provided through user input and/or through the discharge photo-eye, the confidence scores of subsequent object location predictions (e.g., for subsequent objects) may increase and the error ranges may decrease, in some example embodiments.

Flowchart 300 further includes block 306, at which the apparatus 200 is configured to update the virtual map with the prediction of block 305. As previously discussed, the virtual map is configured to be dynamically updated with subsequent predictions and detections, such as the prediction made at block 305. Similarly, the updated virtual map may be provided for display for a user to indicate an updated location of the object 106. In various embodiments, the virtual map, as it is dynamically updated, is accessible and/or stored at the zone controllers 120 and/or the system controller 130 in order to enable subsequent control of each zone 110. That is, in some example embodiments, a zone controller 120 that is associated with a particular zone 110 may control a MDR rotational speed of the particular zone 110 in accordance with control logic for transportation objectives in response to the object 106 being present in the particular zone 110. Thus, the virtual map that indicates the location of the object 106 may be accessible and/or stored by the zone controller 120, in this example, such that the zone controller 120 may be aware that the object 106 is present in the associated particular zone 110. Therefore, in various example embodiments, the virtual map may be communicated between, individually stored and updated, and/or the like by the plurality of zone controllers 120 of the MDR conveyor system 100. Additionally or alternatively, the virtual map may be managed (e.g., updated) by the system controller 130 and/or communicated between the system controller 130 and one or more zone controllers 120.

Flowchart 300 further includes block 307, at which the apparatus 200 is configured to configure a MDR rotational speed of the subsequent zone (e.g., the subsequent zone for which the object presence was predicted at block 305) in accordance with the object 106 being predicted to be currently present in the subsequent zone. That is, in accordance with the prediction made in block 305, the subsequent zone becomes the current zone of the object 106, and as such, the MDR rotational speed of the subsequent zone may then be controlled in order to accomplish transportation objectives for the object 106.

In various embodiments, a zone controller 120 associated with the subsequent zone in which the object 106 is predicted to be currently present is configured to determine and control the MDR rotational speed of the subsequent zone. Further, the zone controller 120 may communicate the MDR rotational speed to other zone controllers 120, such as zone controllers 120 associated with zones downstream of the subsequent zone. Similarly, the zone controller 120 may communicate the MDR rotational speed to the system controller 130. As other zone controllers 120 and/or the system controller 130 are aware of the controlled MDR rotational speed of the subsequent zone, subsequent predictions of the object's location with respect to sequence of zones may be determined.

Flowchart 300 further includes decision node 308, at which the apparatus 200 is configured to determine whether the object 106 is detected at the discharge zone 110N or a final zone of the MDR conveyor system 100 using a second photo-eye 108. Detection of the object 106 at the discharge zone 110N indicates that the transportation of the object 106 by the MDR conveyor system 100 is substantially complete. If the object 106 is not detected at the discharge zone 110N by the second photo-eye 108, then it may be assumed that the object 106 is still being transported within the MDR conveyor system 100, and predictions and mapping (via the virtual map) of the object's location with respect to the sequence of zones may continue. Indeed, as shown in flowchart 300, blocks 305-307 may be performed iteratively, repeatedly, intermittently, and/or the like until the object 106 is detected at the discharge zone 110N by the second photo-eye 108.

If the object 106 is detected at the discharge zone 110N by the second photo-eye, the apparatus 200 is configured to evaluate the accuracy of the virtual map based at least in part on whether the object 106 was predicted to be present at the discharge zone 110N, at block 309 of flowchart 300. Specifically, the detection of the object 106 at the discharge zone 110N (and the timepoint of said detection) may be compared with an indication of the virtual map whether and/or when the object 106 is predicted to be in the discharge zone 110N.

If the virtual map indicates that the object 106 was indeed predicted to be in the discharge zone 110N when the object 106 was detected by the discharge photo-eye, then the virtual map may be considered accurate, and an appropriate accuracy measure may be determined. In some example embodiments, a predicted time of arrival for the discharge zone 110N and the actual timepoint at which the object 106 was detected by the discharge photo-eye are compared, and an accuracy measure is determined based at least in part on a difference between the predicted time of arrival and the actual timepoint. In various embodiments, the accuracy measure or the difference between the predicted time of arrival and actual time of arrival is distributed in unequal intervals to the zones 110 upstream from the discharge zone 110N, or specifically, for object location predictions for the upstream zones 110.

In various embodiments, this accuracy measure may be used as feedback for location predictions for objects subsequently transported by the MDR conveyor system 100. For example, the weights and parameters used with the MDR rotational speed of a current zone and object length to predict object locations can be re-configured based at least in part on the accuracy measure to account for the factors that cause the discrepancy between the predicted object location and actual object location, these factors including material slippage and object inertia. As such, the object location predictions for objects 106 being transported within the MDR conveyor system may improve due to the feedback provided by the discharge photo-eye and/or user input, such that zone control of the MDR conveyor system (which is reliant upon object location relative to the zones 110) is reliable.

Therefore, as described herein, various embodiments of the present disclosure address technical challenges that relate to predicting and mapping a real-time location of an object within a MDR conveyor system, and in various embodiments, the real-time location of an object is predicted with minimal photo-eye infrastructure. Various embodiments described herein may be applied to efficiently and reliably operate a sequence of zones of a MDR conveyor system without over-reliance on photo-eyes for each zone. As described by way of the examples described herein, an object can be detected by a first photo-eye positioned at an infeed point, and based at least in part on the length of the object and a MDR rotational speed that is controlled, configured, set, and/or the like for the infeed zone, the object can be predicted to be in a second zone (e.g., the second zone). This prediction may be repeated for subsequent downstream zones using MDR rotational speeds that are controlled in real-time as the object passes through each zone. Detection of the object at the discharge zone using a second photo-eye can then be used as feedback to re-configure aspects of this prediction, such that the accuracy of object location predictions and mappings improves. Thus, various technical challenges relating to operating zones of a MDR conveyor system and determining object location are overcome through various embodiments described herein.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for operating a conveyor system to transport an object disposed thereon, wherein the conveyor system comprises a plurality of motor driven rollers (MDRs) and having defined a sequence of zones, the method comprising:
   detecting a presence of the object in a first zone of the conveyor system using a first photo-eye, the first zone having a first MDR rotational speed;
   generating a virtual map to describe a real-time location of the object within the conveyor system that is dynamically determined based at least in part on predicting the presence of the object in a given zone at a given timepoint based at least in part on a previously detected and/or predicted presence of the object in one or more preceding zones and a MDR rotational speed of each preceding zone;
   in accordance with the predicted presence of the object in the given zone at the given timepoint, configuring a MDR rotational speed of the given zone for at least the given timepoint; and evaluating an accuracy of the virtual map responsive to detecting the presence of the object in a final zone of the conveyor system using a second photo-eye.

2. The method of claim 1, further comprising:
determining a length of the object based at least in part on the first MDR rotational speed and an elapsed time period during which the presence of the object in the first zone is detected by the first photo-eye.

3. The method of claim 2, wherein the MDR rotational speed of the given zone is configured based at least in part on the length of the object.

4. The method of claim 2, wherein the MDR rotational speed of the given zone is associated with an operational time period including the given timepoint, the operational time period determined based at least in part on the length of the object and representative of a duration of time when the object is present in the given zone.

5. The method of claim 1, wherein evaluating the accuracy of the virtual map comprises:
determining an error measure of the virtual map based at least in part on comparing a predicted final timepoint at which the object was predicted to be present in the final zone with an observed final timepoint at which the presence of the object in the final zone was detected by the second photo-eye.

6. The method of claim 5, further comprising:
determining whether the error measure satisfies one or more error thresholds; and
responsive to a determination that the error measure satisfies the one or more error thresholds, configuring the virtual map for describing a real-time location of one or more subsequent objects within the conveyor system.

7. The method of claim 1, wherein the MDR rotational speed of a particular zone is initialized and/or configured to be at least substantially zero for a time period during which no objects are predicted to be present in the particular zone.

8. An apparatus configured for operation of a conveyor system to transport an object disposed thereon, wherein the conveyor system comprises a plurality of motor driven rollers (MDRs) and having defined a sequence of zones, the apparatus comprising at least one processor and a memory storing executable instructions that, when executed by the at least one processor, cause the apparatus to:
detect a presence of an object in a first zone of the conveyor system using a first photo-eye, the first zone having a first MDR rotational speed;
generate a virtual map to describe a real-time location of the object within the conveyor system that is dynamically determined based at least in part on predicting the presence of the object in a given zone at a given timepoint based at least in part on a previously detected and/or predicted presence of the object in one or more preceding zones and a MDR rotational speed of each preceding zone;
in accordance with the predicted presence of the object in the given zone at the given timepoint, configure a MDR rotational speed of the given zone for at least the given timepoint; and
evaluate an accuracy of the virtual map responsive to detecting the presence of the object in a final zone of the conveyor system using a second photo-eye.

9. The apparatus of claim 8, wherein the executable instructions, when executed by the at least one processor, further cause the apparatus to:
determine a length of the object based at least in part on the first MDR rotational speed and an elapsed time period during which the presence of the object in the first zone is detected by the first photo-eye.

10. The apparatus of claim 9, wherein the MDR rotational speed of the given zone is configured based at least in part on the length of the object.

11. The apparatus of claim 9, wherein the MDR rotational speed of the given zone is associated with an operational time period including the given timepoint, the operational time period determined based at least in part on the length of the object and representative of a duration of time when the object is present in the given zone.

12. The apparatus of claim 8, wherein evaluating the accuracy of the virtual map comprises:
determining an error measure of the virtual map based at least in part on comparing a predicted final timepoint at which the object was predicted to be present in the final zone with an observed final timepoint at which the presence of the object in the final zone was detected by the second photo-eye.

13. The apparatus of claim 12, wherein the executable instructions, when executed by the at least one processor, further cause the apparatus to:
determine whether the error measure satisfies one or more error thresholds; and
responsive to a determination that the error measure satisfies the one or more error thresholds, configure the virtual map for describing a real-time location of one or more subsequent objects within the conveyor system.

14. The apparatus of claim 8, wherein the MDR rotational speed of a particular zone is initialized and/or configured to be at least substantially zero for a time period during which no objects are predicted to be present in the particular zone.

15. A computer program product comprising at least one non-transitory computer-readable storage medium having computer-executable program code portions stored therein, the computer-executable program code portions configured to cause a processor to:
detect a presence of an object in a first zone of the conveyor system using a first photo-eye, the first zone having a first MDR rotational speed;
generate a virtual map to describe a real-time location of the object within the conveyor system that is dynamically determined based at least in part on predicting the presence of the object in a given zone at a given timepoint based at least in part on a previously detected and/or predicted presence of the object in one or more preceding zones and a MDR rotational speed of each preceding zone;
in accordance with the predicted presence of the object in the given zone at the given timepoint, configure a MDR rotational speed of the given zone for at least the given timepoint; and
evaluate an accuracy of the virtual map responsive to detecting the presence of the object in a final zone of the conveyor system using a second photo-eye.

16. The computer program product of claim 15, wherein the computer-executable program code portions are further configured to cause a processor to:
determine a length of the object based at least in part on the first MDR rotational speed and an elapsed time period during which the presence of the object in the first zone is detected by the first photo-eye.

17. The computer program product of claim 16, wherein the MDR rotational speed of the given zone is configured based at least in part on the length of the object.

18. The computer program product of claim 16, wherein the MDR rotational speed of the given zone is associated with an operational time period including the given timepoint, the operational time period determined based at least in part on the length of the object and representative of a duration of time when the object is present in the given zone.

19. The computer program product of claim 15, wherein evaluating the accuracy of the virtual map comprises:
   determining an error measure of the virtual map based at least in part on comparing a predicted final timepoint at which the object was predicted to be present in the final zone with an observed final timepoint at which the presence of the object in the final zone was detected by the second photo-eye.

20. The computer program product of claim 19, wherein the computer-executable program code portions are further configured to cause a processor to:
   determine whether the error measure satisfies one or more error thresholds; and
   responsive to a determination that the error measure satisfies the one or more error thresholds, configure the virtual map for describing a real-time location of one or more subsequent objects within the conveyor system.

\* \* \* \* \*